United States Patent
Soler Esteban et al.

(10) Patent No.: US 8,816,235 B2
(45) Date of Patent: Aug. 26, 2014

(54) MACHINE FOR THE INSPECTION AND SORTING OF FRUITS AND INSPECTION AND SORTING METHOD USED BY SAID MACHINE

(75) Inventors: Alvaro Soler Esteban, Cocentaina (ES); Simon Van Olmen, Cocentaina (ES)

(73) Assignee: Multiscan Technologies, S.L., Cocentaina (ES)

( * ) Notice: Subject to any disclaimer, the term of this patent is extended or adjusted under 35 U.S.C. 154(b) by 119 days.

(21) Appl. No.: 13/700,046

(22) PCT Filed: Jun. 8, 2010

(86) PCT No.: PCT/EP2010/003423
§ 371 (c)(1),
(2), (4) Date: Feb. 27, 2013

(87) PCT Pub. No.: WO2011/154017
PCT Pub. Date: Dec. 15, 2011

(65) Prior Publication Data
US 2013/0146509 A1  Jun. 13, 2013

(51) Int. Cl.
*B07C 5/342* (2006.01)
*B07C 5/36* (2006.01)

(52) U.S. Cl.
CPC ......... *B07C 5/342* (2013.01); *B65G 2201/0211* (2013.01); *B07C 5/366* (2013.01); *Y10S 209/919* (2013.01)
USPC .......................... 209/579; 209/44.2; 209/919

(58) Field of Classification Search
CPC ...... B07C 5/342; B07C 5/3422; B07C 5/366; B07C 2501/009
USPC ......... 209/44.2, 577, 579, 587, 644, 919, 939
See application file for complete search history.

(56) References Cited

U.S. PATENT DOCUMENTS

| | | | | |
|---|---|---|---|---|
| 4,308,959 A | * | 1/1982 | Hoover et al. | 209/563 |
| 4,726,898 A | * | 2/1988 | Mills et al. | 209/545 |
| 5,020,675 A | * | 6/1991 | Cowlin et al. | 209/538 |
| 5,156,278 A | * | 10/1992 | Aaron et al. | 209/556 |
| 5,237,407 A | * | 8/1993 | Crezee et al. | 348/89 |

(Continued)

FOREIGN PATENT DOCUMENTS

| | | |
|---|---|---|
| EP | 0 705 650 | 4/1996 |
| EP | 0 719 598 | 7/1996 |
| JP | 59 031205 | 2/1984 |

OTHER PUBLICATIONS

International Search Report for international Application No. PCT/EP2010/003423 mailed Apr. 5, 2011.

*Primary Examiner* — Joseph C Rodriguez
(74) *Attorney, Agent, or Firm* — Merchant & Gould P.C.

(57) ABSTRACT

Machine for the inspection and sorting of fruits, which has, connected to a control system, an inspection unit (1) and ejection means (3) which eject the fruits inspected by the inspection unit (1) which do not comply with certain conditions pre-established by the control system. The product transport means have a plurality of rotating rollers (7) which rotate the fruits they transport as they advance, providing multiple views of said fruits to the artificial vision system (4), and a final section for the fall of the fruits with a curved surface with variable decreasing radius. The present invention also consists of a method to inspect and sort fruits which makes them rotate during their transport and inspection and sets their acceleration at the discharge from the machine through a curved surface with decreasing radius.

12 Claims, 5 Drawing Sheets

(56) References Cited

U.S. PATENT DOCUMENTS

| | | | |
|---|---|---|---|
| 5,315,879 A * | 5/1994 | Crochon et al. | 73/818 |
| 5,339,963 A * | 8/1994 | Tao | 209/581 |
| 5,960,098 A * | 9/1999 | Tao | 382/110 |
| 5,988,351 A * | 11/1999 | Warkentin | 198/370.04 |
| 6,410,872 B2 * | 6/2002 | Campbell et al. | 209/577 |
| 6,888,082 B1 * | 5/2005 | Blanc | 209/576 |
| 6,998,559 B2 * | 2/2006 | De Baerdemaeker et al. | 209/590 |

* cited by examiner

MACHINE FOR THE INSPECTION AND SORTING OF FRUITS AND INSPECTION AND SORTING METHOD USED BY SAID MACHINE

This application is a National Stage Application of PCT/EP2010/003423, filed 8 Jun. 2010 and which application is incorporated herein by reference. To the extent appropriate, a claim of priority is made to the above disclosed application.

TECHNICAL FIELD OF THE INVENTION

The present invention refers to the technical field of machines for the inspection and sorting of objects, particularly machines for the inspection and sorting of fruits and small edible products, and more particularly to machines which transport the fruits to an inspection unit and extract them from it, ejecting the fruits which do not comply with certain conditions pre-established by a control system, thereby carrying out a fruit sorting.

BACKGROUND OF THE INVENTION

So far there have been used a great number of devices for the inspection and sorting of small objects, particularly fruits and small edible products, based on the transportation through endless means, such as bands, chains, or conveyor belts, of the fruits to be inspected, to a section in which their inspection is carried out. This inspection, as the case may be, can consist of different analysis, such as size, shape and existing defect analysis, or a sorting and separation of fruits based on size, shape, etc.

These devices for fruit inspection are for example the devices for the automatic sorting of agricultural products, such as fruits, with a roller conveyor, said rollers being tilted to distribute the products to different auxiliary paths and a measuring station.

Other devices are formed by a fruit and vegetable treatment and manipulation train, which also has a pre-selection conveyor which through the rollers derives the products to different stations. Another gauging conveyor rejects the units which are too big or too small.

These machines have the inconvenience that they do not carry out very detailed or precise selections, not detecting small shape variations or visually noticeable defects. In order to solve these problems, there exist nowadays sorting machines which by the use of cameras inspect small articles which are displaced on a conveyor belt, but which have the problem of offering a very limited number of product views, unless many cameras are installed to be able to obtain many views of the articles, increasing the inspection system costs as well as its mounting costs. It must also be considered that installing cameras under the machine to obtain lower views of the product produces a constant problem of dirt accumulating on said cameras. Particularly, certain systems make the products advance and rotate through rollers under a vision system, providing multiple views to the vision system. This system has a problem when the product to be inspected is very small because the holes between the rollers must be very small, and, either they do not allow an ejection of the products from the inside through said holes, or if they allow it, as the products are so small, the ejection of each one of them affects the products close by, displacing them or even ejecting products which should not be ejected. In order to avoid these problems, the ejection must be made from the outside, so it has to be made right when the products abandon the roller train, in the air, but this has the inconvenience that there is a problem of instability at the discharge due to the acceleration suffered by the products when they pass from one straight section of the conveyor to a curved one. This punctual acceleration leads to changes in the normal discharge path of the conveyor products, which prevents their precise ejection, as they are not in the estimated place at the estimated time.

It was therefore desirable a system which attained an efficient fruit and small product inspection and sorting, avoiding the inconveniences existing in the previous systems in the state of the art.

DESCRIPTION OF THE INVENTION

The present invention solves the existing problems in the state of the art through a fruit inspection and sorting machine, formed mainly by a fruit inspection unit connected to a control system, transport means which take them to the inspection unit and extract them from it once the inspection is completed, and ejection means located at the end of the transport means which eject the fruits from the machine which after being inspected by the inspection unit do not comply with certain conditions pre-established by the control system, that is, classify products based on certain conditions pre-established by the control system.

The inspection unit has an artificial vision system formed by at least one camera. As it has been indicated above, the inspection unit is connected to a control system, which controls the entire operation of the machine. This control system receives the image taken by the inspection unit, and according to several pre-established parameters which it has stored it decides whether to deliver the fruit to fruit reception means, or eject it because it does not comply with specific requirements, such as being within a size range, or having a specific shape, or certain characteristics in its outer appearance, etc.

The transport means have an initial section which leads the fruits to the inspection unit, and a final section which extracts them from it, and leads them to reception means through different outlets, depending on the characteristics of the fruit which have been inspected in the inspection unit.

In the present invention the transport means consists of a conveyor belt formed by a plurality of rotating rollers, which make the fruits transported in the beds, or spaces between rollers, rotate, at the same time as these products advance, thus providing multiple views of the fruits to the artificial vision system, so that said vision system does not need to have different cameras in different positions to capture the different views. Thus, if desired, with only one camera, it would be possible to obtain different views of the fruits to be inspected.

Preferably, the rollers of this conveyor belt have a variable rotation speed, and different rotation speeds in different sections of the belt, which helps the positioning of fruits when necessary, that is, especially in the inspection unit, so that the fruits enter it in different specific positions for their inspection and offer different views to the artificial vision system. Besides, the variable rotation speed of the rollers provides the possibility to adapt and adjust the roller rotation according to the size of the fruit to be inspected.

Another advantage of the roller variable rotation speed is that it can position certain fruits, depending on its configuration, for a better inspection thereof. For example, when cherries are inspected it is convenient to be able to position the peduncle thereof towards the back before they enter the inspection unit, and later rotate the cherries 180° towards the front in the inspection unit, without the peduncle forcing them to change bed or housing between rollers. Additionally, the variable rotation speed makes the product rotate at greater speed in the product feeder area than in the rest of it, so that a better distribution of the product on the belt is attained, favoring the positioning of a unit in each bed or space between rollers.

In the machine object of the invention, the final section of the means of transport has at the end thereof a curved surface for the fruits to fall from these means of transport and leave the machine, once inspected. This constitution, in which the curved surface has a constant radius, causes instability at the product discharge, producing an uneven discharge path. This instability is produced when passing from the straight section of the transport means to the curved section and it is due to the fact that the radius described by the product mass center in the curved section is greater than the radius described by the inner surface of the transport means of said section. This radius difference causes a sudden speed increase to be transmitted to the product, which originates a high punctual acceleration which destabilizes the product discharge. This fact is essential for an appropriate ejection of fruits and other very small objects, since in order to be able to transport very small fruits, a very small—almost non-existent—separation is needed between the rollers displacing them. This almost non-existent separation prevents the ejection of fruits "from the inside to the outside", that is, through ejection means located inside the machine, behind the rollers. In this case, the ejection must be carried out using ejection means located on the rollers or laterally thereto, so that the ejection must be carried out when the fruit is in the air, that is, right when they leave the transport means at the final part of the curved section. If there exists instability at the product discharge from the curved surface the correct ejection of the products which must be ejected will not take place.

In order to solve this problem, the final section of the transport means of the present invention has a curved surface with variable decreasing radius along a part which runs from its beginning and at least up to the point where the fruits transported fall from the transport means. This provides an advantage over the conveyors with curved discharge surface of constant radius, namely, that as it starts with a great curvature radius, and gradually reducing it, it is possible to limit the acceleration transmitted to the fruits, thus eliminating the instabilities originating uneven fruit discharge paths and facilitating the ejection of fruits through ejection means.

As regards the ejection means, they are formed by at least a compressed air blower, which ejects the fruits which do not comply with the conditions pre-established by the control system. This blower can be arranged under the transport means and eject the fruits to the outside of the machine, or as indicated above, in the case of small fruits and the almost non-existent separation between rollers of the transport means, outside the transport means. Particularly, there can exist different blowers, which provide different discharge channels for different sorts of fruits.

According to a particular embodiment of the invention, the artificial vision system has at least one laser emitter. This laser emitter can be used as an additional lighting source, as indicator of fruit opacity, or as fruit scanning means. According to this last option, the laser profile emitted by the laser emitter and reflected on the fruits to be inspected is a line, and the image captured by the camera is an accumulation of different consecutive laser profiles emitted by the laser emitter and reflected on the different fruit parts, due to the relative movement between the fruits to be scanned and the laser emitter. In this case the laser emitter remains fixed and the fruits move displaced by transport means within the inspection unit.

However, according to alternative embodiments, the laser emitter could be the one which moves and the fruits can be fixed inside the inspection unit, or else the fruits as well as the laser emitter can move.

In this way, the camera(s) of the artificial vision system can capture the image of the fruits directly, they can capture the image of the laser profiles emitted by the laser emitter and reflected on the fruits, or else they can capture both types of images, that is, the same camera can capture the direct image of the fruits and the image of the laser profiles reflected on the fruits, either simultaneously or alternatively.

Another object of the present invention is a method to inspect and sort fruits, using the machine described above.

In said method the transport of fruits is carried out endlessly up to the inspection unit through transport means, the fruits are inspected endlessly through the artificial vision system of this inspection unit, for later transporting the fruits endlessly from the inspection unit up to an outlet of the machine for their collection, ejecting before the collection point of the fruits inspected by the inspection unit those which do not comply with certain conditions pre-established by the control system.

In this method, the products rotate during their transport and inspection by means of rollers of the transport means, so that multiple views of the fruits are provided to the artificial vision system of the inspection unit.

Also, in said method the discharge acceleration of the fruits is set to a pre-established limit, through a curved surface of variable decreasing radius along a section between the start of the curved surface and at least up to the point in which the fruits transported fall from the transport means. In this way the instability is eliminated in the fall of the products transported, originated by the acceleration when going from a straight section to a curved one.

DESCRIPTION OF THE DRAWINGS

The following is a description of a series of drawings which will help understand the invention better relating to an embodiment of said invention which is presented as a non-limiting example thereof.

In these figures reference is made to the following set of elements:
1. inspection unit
2. transport means
3. ejection means
4. artificial vision system of the inspection unit
5. camera of the artificial vision system
6. laser emitter of the artificial vision system
7. rollers of the transport means
8. compressed air blower
9. curved surface of the transport means

DESCRIPTION OF PREFERRED EMBODIMENTS OF THE INVENTION

Figure 1:
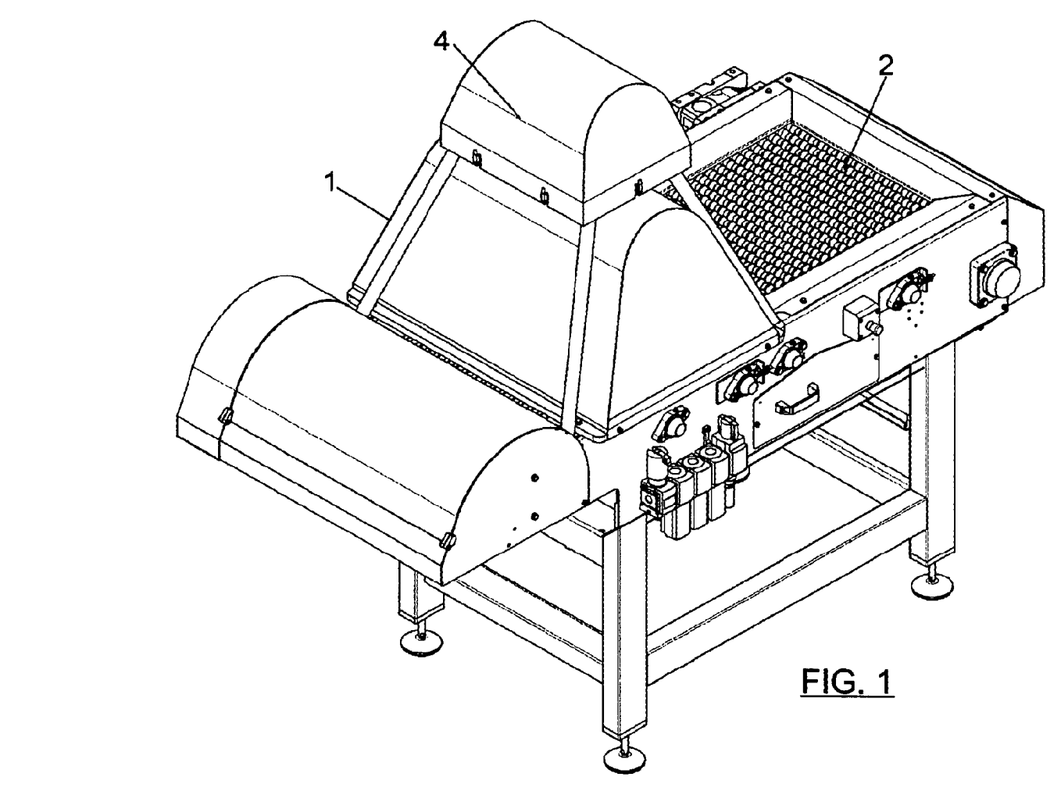
FIG. 1 is a schematic perspective view of a machine for the inspection and sorting of fruits object of the present invention.

An object of the present invention is a machine for the inspection and sorting of fruits. As it can be seen in the figures, the machine for the inspection and sorting of fruits has as its main element an inspection unit 1 which is connected to a control system, and which is in charge of inspecting the fruits. Additionally, the machine has transport means 2, which transport the fruits through an initial section up to an inspection unit 1, and remove them from it through a final section when the inspection has been performed. Finally, the machine has ejection means 3, which are in the final section of the transport means 2, and eject from the machine the fruits inspected by the inspection unit 1 which do not comply with certain conditions pre-established by the control system, such as having a size within a particular range, or a specific shape or outer appearance, etc. FIG. 1 shows a schematic view of the entire machine for the inspection and sorting of fruits.

Figure 2:
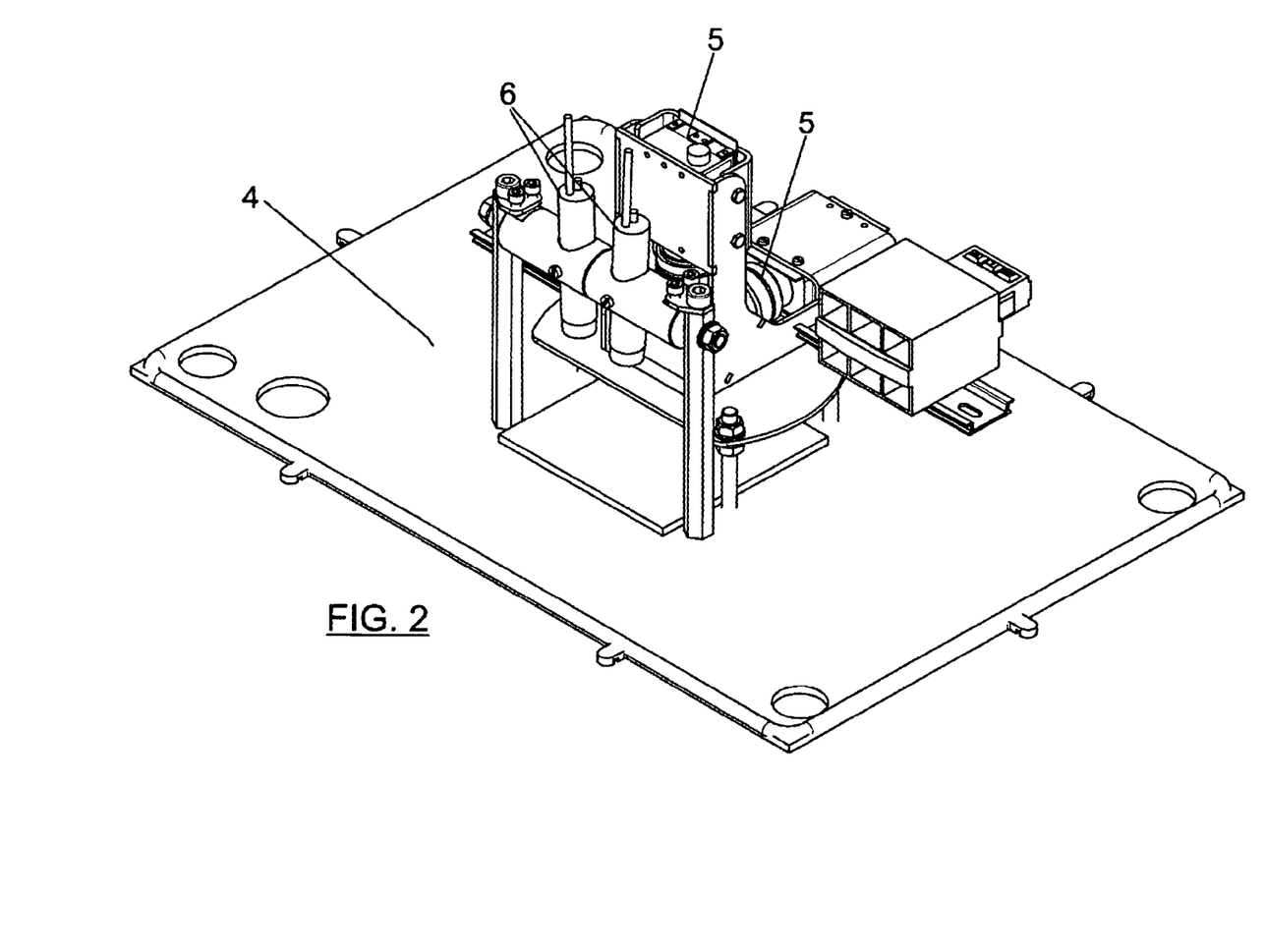
FIG. 2 is a schematic detailed view of the artificial vision system of the inspection unit.

As it can be seen in FIG. 1, and particularly in FIG. 2, the inspection unit 1 of the machine for the inspection and sorting of fruits has an artificial vision system 4, which is in turn formed by at least one camera 5. Preferably, the camera 5 is an area camera or array camera, although different technologies can be used which provide different image output formats of the fruits to be inspected.

The inspection unit 1 is connected to the control system, which is the one that controls the entire machine operation. This control system receives the image captured by the inspection unit 1, and taking into account several saved pre-established parameters it decides whether to continue with the delivery of a particular fruit to the reception means, or to eject it because it does not comply with certain requirements represented by pre-established parameters, such as, for example, having a size within a specific range, having a particular shape or certain characteristics in its outer appearance.

In order to provide rotation for the transported products as they move, the transport means 2 are formed by a conveyor belt which is in turn formed by a plurality of rollers 7, thus attaining multiple views of the fruits for the artificial vision system 4. In this way, with only one camera 5 in one position different views of the fruits would be obtained. Preferably, the rotation speed of the rollers 7 along the transport means is variable, and there are distinguished different sections in which the rollers 7 have different rotation speeds. In this way, the fruits will be able to rotate more when necessary, to adopt certain positions needed for their inspection. According to a particular embodiment of the invention, the variable speed of the rollers 7 is attained by making them rest on a variable speed belt.

According to a preferred embodiment of the invention, the artificial vision system 4 of the inspection unit 1 has at least one laser emitter 6. The operation of the inspection unit 1 with this laser emitter consists of the laser profile which is emitted by the laser emitter 6 and reflected on the fruits to be inspected being a line, and the image captured by the camera 5 is an accumulation of different consecutive laser profiles emitted by the laser emitter 6 and reflected on the different fruit parts, due to the relative movement between the fruits to be scanned and the laser emitter 6. In this case the laser emitter 6 remains fixed and the fruits move displaced by transport means 2 within the inspection unit 1.

However, according to alternative embodiments, the laser emitter 6 could be the one which moves and the fruits can be fixed inside the inspection unit 1 for the entire duration of said inspection, or else the fruits as well as the laser emitter 6 can move. According to a particular embodiment of the invention, if there is only one camera, it can be intended to capture the image of the fruits directly, to capture the image of the profiles emitted by the laser emitter 6 reflected on the products, or divide it so that part of the image from the camera 5 is intended to capture the image of the fruits and part of the image of the profiles emitted by the laser emitter 6. If there is more than one camera 5, one of them can be intended to capture images of the fruits and the rest of them can be used to capture images of profiles emitted by the laser emitter 6.

Figure 3:
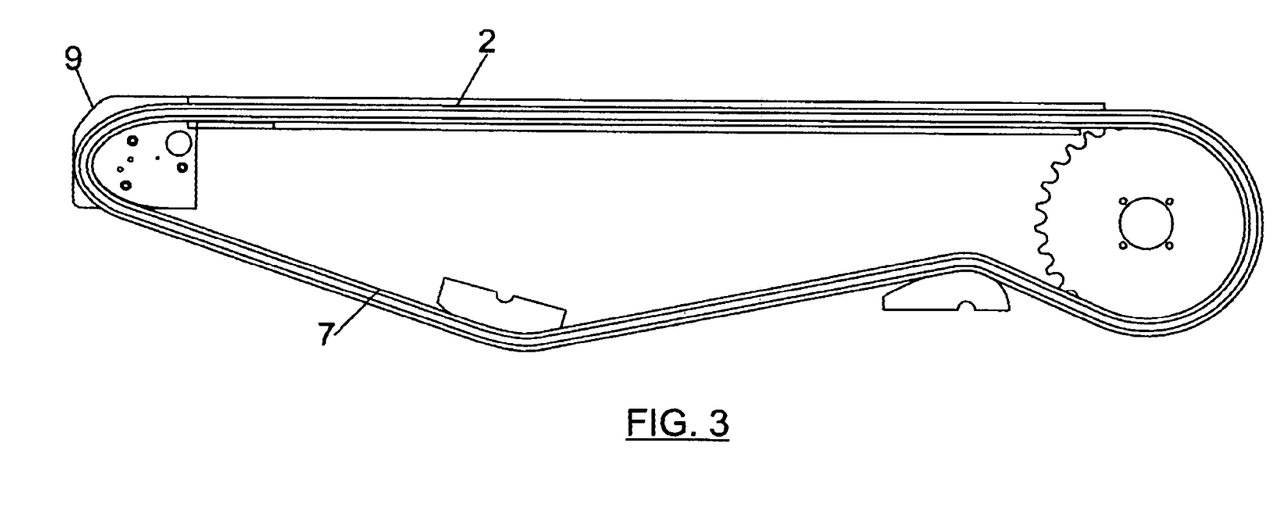
FIG. 3 is a schematic view of the final section of the transport means with a curved surface for the fall of the fruits having a variable decreasing radius.

FIG. 3 shows a schematic view of the final section of the transport means 2, in which it can be observed that there exists a curved surface 9 for the fall of the fruits which has a variable decreasing radius along a section going from its start to at least the point in which the transported fruits fall from the transport means 2. This configuration eliminates the instabilities at the fruit discharge, and the uneven discharge paths, as it prevents the fruits from having a higher acceleration than a pre-established limit.

Preferably, the inspection unit 1 has a plurality of pulsed lighting systems, which provide lighting with different spectrum, so that in this way a single camera 5 can capture images in different spectra.

Figure 4:
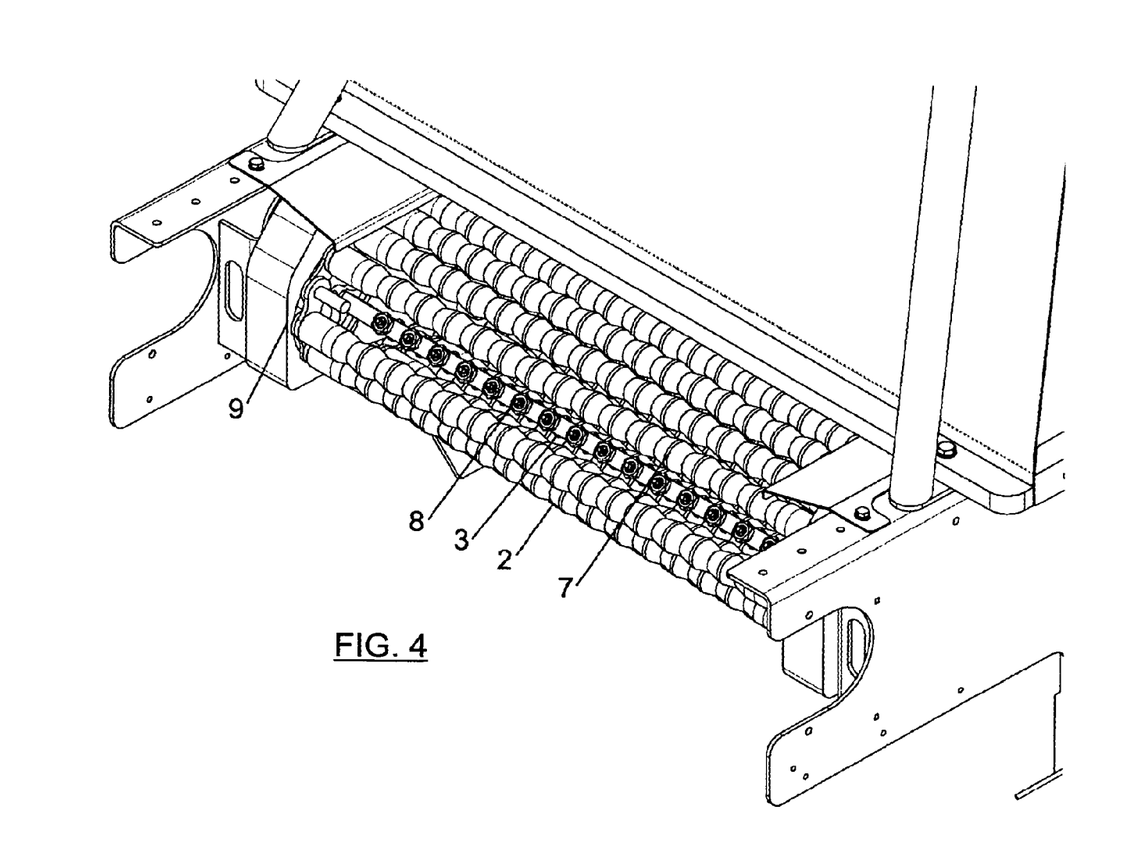
FIG. 4 shows a particular embodiment of the compressed air blower of the fruit ejection means of the machine.
Figure 5:
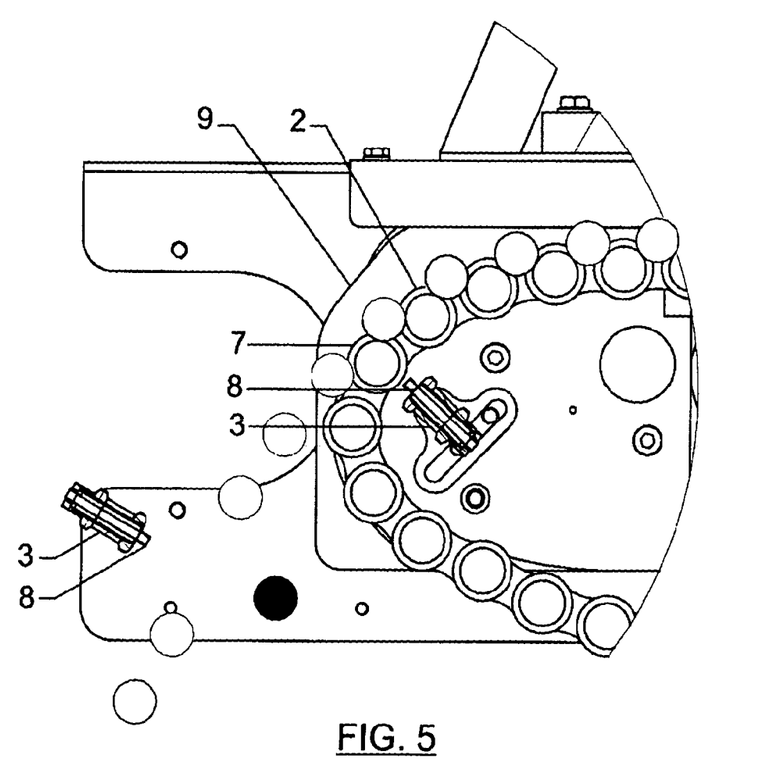
FIG. 5 shows a different configuration of the fruit ejection means, in which there is a compressed air blower under the transport means and a blower outside the transport means.

As regards the ejection means 3, they are formed by at least one compressed air blower 8, which ejects the fruits which do not comply with the conditions pre-established by the control system. The blower 8 can be located under the transport means 2, so the fruit, discharge would be towards the outside of the machine, or outside the transport means 2, so the fruit discharge would be towards the inside. It is also possible to make a combination of different blowers 8 arranged in different locations, to attain different discharges for the fruits rejected in the inspection. The different discharges can also be attained through different densities in the air blowing of the blowers 8, all of which are regulated by the control system.

FIG. 5 shows a preferred configuration of the ejection means 3, in which the blowers 8 are located under the transport means 2 and outside them, and which shows in white the fruits which were not ejected and fall from the machine to be collected, and a fruit ejected by the blowers 8 is shown in black.

Additionally, the machine has a nozzle in front of the ejection means, or several nozzles, if there exist different blowers 8, which collect the fruits which do not comply with the conditions pre-established by the control system and are ejected from the machine.

Also preferably, the machine object of the present invention has cleaning showers which are located along the initial section of the transport means 2 so that the fruit cleaning can be carried out before they enter the inspection unit 1 to be inspected. Another object of the present invention is a method to inspect and sort fruits, using the machine described above.

In said method there is an endless transport of fruits up to the inspection unit 1 through transport means 2, the fruits being inspected continuously through an artificial vision system 4 of this inspection unit 1. Later, the fruits are transported endlessly from the inspection unit 1 to a discharge of the machine for their collection, ejecting before this collection point the fruits inspected by the inspection unit 1 which do not comply with certain conditions pre-established by the control system.

In this method the products rotate during their transport and inspection through rollers 7 of the transport means, providing multiple views of the fruits to the artificial vision system of the inspection unit.

Also, in said method the discharge acceleration of the fruits is set to a pre-established limit, through a curved surface 9 of variable decreasing radius along a section between the start of the curved surface and at least up to the point in which the fruits transported fall from the transport means. In this way it is possible to eliminate the instability in the fall of the products transported originated by the acceleration when going from a straight section to a curved one 9.

Once the invention has been clearly described, it is worth highlighting that the particular embodiments described above can be modified in detail as long as the main principle and essence of the invention is not altered.

The invention claimed is:

1. Machine for the inspection and sorting of fruits, comprising:
    an inspection unit which inspects fruits, connected to a control system, comprising an artificial vision system, which in turn comprises at least one camera,
    transport means, which transport the fruits through an initial section up to the inspection unit, and extract the fruits from the inspection unit through a final section when the inspection has been carried out, and
    ejection means arranged in the final section of the transport means, and connected to the control system, which eject from the machine the fruits inspected by the inspection unit which do not comply with certain conditions pre-established by said control system,
    wherein the transport means comprise a conveyor belt formed by a plurality of rotating rollers which make the transported fruits rotate while the fruits advance, providing multiple views of said fruits to the artificial vision system,
    wherein the final section of the transport means comprises at a end thereof a curved surface for the fall of the fruits of said transport means and exit from the machine, said curved surface having a variable decreasing radius along a section which runs from a start and at least up to a point where the transported fruits fall from the transport means.

2. The machine for the inspection and sorting of fruits according to claim 1, wherein the transport means comprise a plurality of sections with different roller rotation speed.

3. The machine for the inspection and sorting of fruits according to claim 1, further comprising a plurality of cleaning showers arranged along an on initial section of the transport means for the cleaning of fruits before the fruits are inspected in the inspection unit.

4. The machine for the inspection and sorting of fruits according to claim 1, wherein
    the artificial vision system comprises at least one laser emitter
    and the camera captures an image of a laser profile emitted by the laser emitter and reflects the laser profile on the fruits to be inspected.

5. The machine for the inspection and sorting of fruits according to claim 1, wherein
    the laser emitter stays fixed,
    and the laser profile emitted by the laser emitter and reflected on the fruits to be inspected is a line,
    the image captured by the camera being an accumulation of different consecutive laser profiles emitted by the laser emitter and reflected on different parts of the fruits displaced by the transport means.

6. The machine for the inspection and sorting of fruits according to claim 4, wherein a single camera captures images of the fruits and images of the profiles emitted by the laser emitter.

7. The machine for the inspection and sorting of fruits according to claim 1, wherein the inspection unit comprises a plurality of pulsed lighting systems, which provide lighting with different spectrum, capturing the only camera images in different spectra.

8. The machine for the inspection and sorting of fruits according to claim 1, wherein at least one of the lighting systems is a laser emitter.

9. The machine for the inspection and sorting of fruits according to claim 1, wherein the ejection means comprise at least a compressed air blower which ejects the fruits according to the conditions pre-established by the control system.

10. The machine for the inspection and sorting of fruits according to claim 1, wherein at least one blower is arranged under the transport means, carrying out the ejection of the fruits which do not comply with the pre-established conditions.

11. The machine for the inspection and sorting of fruits according to claim 9, wherein at least one blower is located outside the transport means, wherein the ejection of the fruits according to the pre-established conditions takes place once the fruits leave the transport means through the curved surface of the final section.

12. Method for the inspection and sorting of fruits using the machine of claim 1, comprising:
    transporting the fruits endlessly to the inspection unit through transport means,
    inspecting the fruits endlessly in the inspection unit through the artificial vision system of said inspection unit,
    and transporting the fruits endlessly from the inspection unit to a discharge of the machine for their collection,
    rotating the products during transport and inspection through rollers of the transport means, providing multiple views of said fruits to the artificial vision system of the inspection unit,
    setting the discharge acceleration of the fruits to a pre-established limit through a curved surface of variable decreasing radius along a section between a start of the curved surface and at least up to a point in which the transported fruits fall from the transport means,
    and endlessly ejecting the fruits inspected by the inspection unit according to certain conditions pre-established by said control system.

* * * * *